(12) United States Patent
Kinjyo et al.

(10) Patent No.: US 7,591,472 B2
(45) Date of Patent: Sep. 22, 2009

(54) SUSPENSION STRUCTURE FOR SMALL VEHICLE

(75) Inventors: Toshiki Kinjyo, Saitama (JP); Takeshi Okaniwa, Saitama (JP); Takuya Tagami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 11/524,376

(22) Filed: Sep. 21, 2006

(65) Prior Publication Data

US 2007/0069494 A1    Mar. 29, 2007

(30) Foreign Application Priority Data

Sep. 26, 2005    (JP)    ............................. 2005-278223

(51) Int. Cl.
*B60G 21/055*    (2006.01)
*B60G 7/00*    (2006.01)
*B60G 3/18*    (2006.01)

(52) U.S. Cl. .................. 280/124.152; 280/124.135; 280/124.136; 280/124.137; 280/124.166; 267/188

(58) Field of Classification Search .................. 280/124.134–124.139, 124.141–124.143, 280/124.166, 124.152; 267/188
See application file for complete search history.

(56) References Cited

FOREIGN PATENT DOCUMENTS

| JP | 63-134390 A | | 6/1988 |
|----|-------------|---|--------|
| JP | 2-270617 A | * | 5/1990 |
| JP | 10-258763 A | * | 9/1998 |

* cited by examiner

*Primary Examiner*—Ruth Ilan
(74) *Attorney, Agent, or Firm*—Birch, Stewart, Kolasch & Birch, LLP (57) ABSTRACT

In rear wheel suspensions, which suspend left and right rear wheels independently, to downsize, reduce in weight and simplify a stabilizer without specifically strengthening the same. Upper and lower arms which form suspension arms in a double wishbone structure are swingably supported by a front arm supporting frame and a rear arm supporting frame provided on front and rear sides of a rear cushion. A cross portion of a stabilizer is swingably supported by the stabilizer brackets provided on a front surface of the rear arm supporting frame, and left and right arm portions extending toward the front are arranged upwardly of the left and right upper arms so as to be placed inside thereof in plan view respectively, and distal ends thereof are connected to the left and right upper arms respectively.

10 Claims, 6 Drawing Sheets

SUSPENSION STRUCTURE FOR SMALL VEHICLE

CROSS-REFERENCE TO RELATED APPLICATIONS

This nonprovisional application claims priority under 35 U.S.C. § 119(a) on Patent Application No. 2005-278223, filed in Japan on Sep. 26, 2005, the entirety of which is incorporated herein by reference.

BACKGROUND OF THE INVENTION

1. Field of the Invention

The present invention relates to a suspension structure for a small vehicle that is suitable for rough-terrain traveling, such as a golf cart or a buggy vehicle.

2. Description of Background Art

In a rear wheel suspension for a small vehicle used for rough-terrain traveling or the like, there is known a structure in which a stabilizer for connecting left and right suspension arms is composed of a twisted portion extending widthwise of the vehicle and arm portions bent at left and right portions thereof toward the rear. The left and right arm portions are arranged so as to protrude outward toward left and right sides of a vehicle body frame (see JP-A-63-134390).

The stabilizer in the structure described above is configured in such a manner that the left and right arm portions protrude outward from the vehicle body frame, and there are areas where other members such as the vehicle body frame are not arranged under the arm portions. Therefore, the stabilizer may come into contact with obstacles such as rocks. Therefore, it has been necessary to strengthen the stabilizer itself sufficiently by increasing a diameter thereof or to provide a separate member for protecting the stabilizer. However, when strengthening the stabilizer by itself or providing another member for protecting the stabilizer, there are cases such that the weight of the vehicle body is increased or the number of components is increased, so that the structure of the vehicle body becomes complicated. Therefore, a suspension structure for a small vehicle in a light weight and a simple structure has been desired. This invention is intended to realize the requirements as described above.

SUMMARY OF THE INVENTION

In order to solve the above-described problems, a first aspect of the present invention is directed to a suspension structure for a small vehicle, the small vehicle including a vehicle body frame, left and right rear wheels to be suspended independently at left and right positions on a rear portion thereof via suspension arms, and a stabilizer for connecting the left and right suspension arms, the stabilizer being arranged upwardly of the left and right arms and inside the left and right suspension arms in plan view.

According to a second aspect of the present invention, cushions for swingably supporting the suspension arms are arranged outwardly of the stabilizer.

According to a third aspect of the present invention, the vehicle body frame includes arm supporting frames provided in front of and rear of the suspension arm for swingably supporting ends thereof, and the stabilizer is supported so as to be capable of swinging toward the front with respect to the rear arm supporting frame.

According to a fourth aspect of the present invention, the vehicle body frame includes a cross member extending in a direction of vehicle width on a lower back side of the stabilizer.

The above problems are also solved according to a fifth aspect of the present invention. Specifically, a small vehicle includes wheels that are independently suspended via a double wishbone structure. The double wishbone structure includes suspension arms having an upper arm and a lower arm on upper and lower sides on left and right sides of a vehicle body frame, and the left and right suspension arms are connected by a stabilizer. According to the fifth aspect of the present invention, the stabilizer is arranged inside the upper arms or the lower arms in plan view, and is connected to the left and right upper arms.

According to a sixth aspect of the present invention, the stabilizer is arranged on an upper side of the upper arms in side view.

According to the first aspect of the present invention, the stabilizer is arranged upwardly of the left and right suspension arms, and is inside the suspension arms in plan view. Therefore, the stabilizer is protected by being surrounded by the suspension arms. In addition, the strength of the stabilizer by itself does not have to be increased, the stabilizer is not increased in weight, and a separate member does not have to be provided specifically for protecting the stabilizer. In addition, the stabilizer does not protrude outward from the suspension arm. Therefore, it can be downsized, so that the existence of the stabilizer does not affect the vehicle width. In addition, in the suspension structure having the stabilizer, an increase in the number of components and weight can be prevented, and the suspension structure can be simplified so that a compact, light weight and simple configuration is achieved.

According to the second aspect of the present invention, the stabilizer is arranged inside the cushions. Therefore, the stabilizer can be downsized, and a structure in which the swinging movement is not hindered while further protecting of the stabilizer by itself with the cushions is achieved.

According to the third aspect of the present invention, the stabilizer is supported by the arm supporting frame on the rear side out of the arm supporting frames provided on the front and rear sides of the suspension arm so as to be capable of swinging forward. Therefore, the stabilizer can be protected by the vehicle body frame, and the vehicle body frame can be simplified by supporting the stabilizer using the arm supporting frame, which is a part of the vehicle body frame.

According to the fourth aspect of the present invention, the vehicle body frame is provided with the cross member extending in the direction of the vehicle width on the lower back side of the stabilizer and the stabilizer is protected by the cross member. Therefore, the stabilizer can be protected in a simple configuration.

According to the fifth aspect of the present invention, the suspension structure is formed into an independent suspension type having a double wishbone structure, the left and right suspension arms of the vehicle body frame include the upper and lower arms, the stabilizer is arranged inside the upper arms or the lower arms in plan view and the respective upper arms are connected by the stabilizer. Therefore, at least the lower arm can be used as the protecting member for the stabilizer, and hence the stabilizer can be downsized and reduced in weight, whereby light weight and simple suspension structure with the stabilizer is achieved, and a structure suitable for the suspension in the double wishbone structure is achieved.

According to the sixth aspect of the present invention, the stabilizer is arranged on the upper side of the upper arms in side view. Therefore, the stabilizer can be arranged easily without interference with the upper arms or the lower arms.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 1:
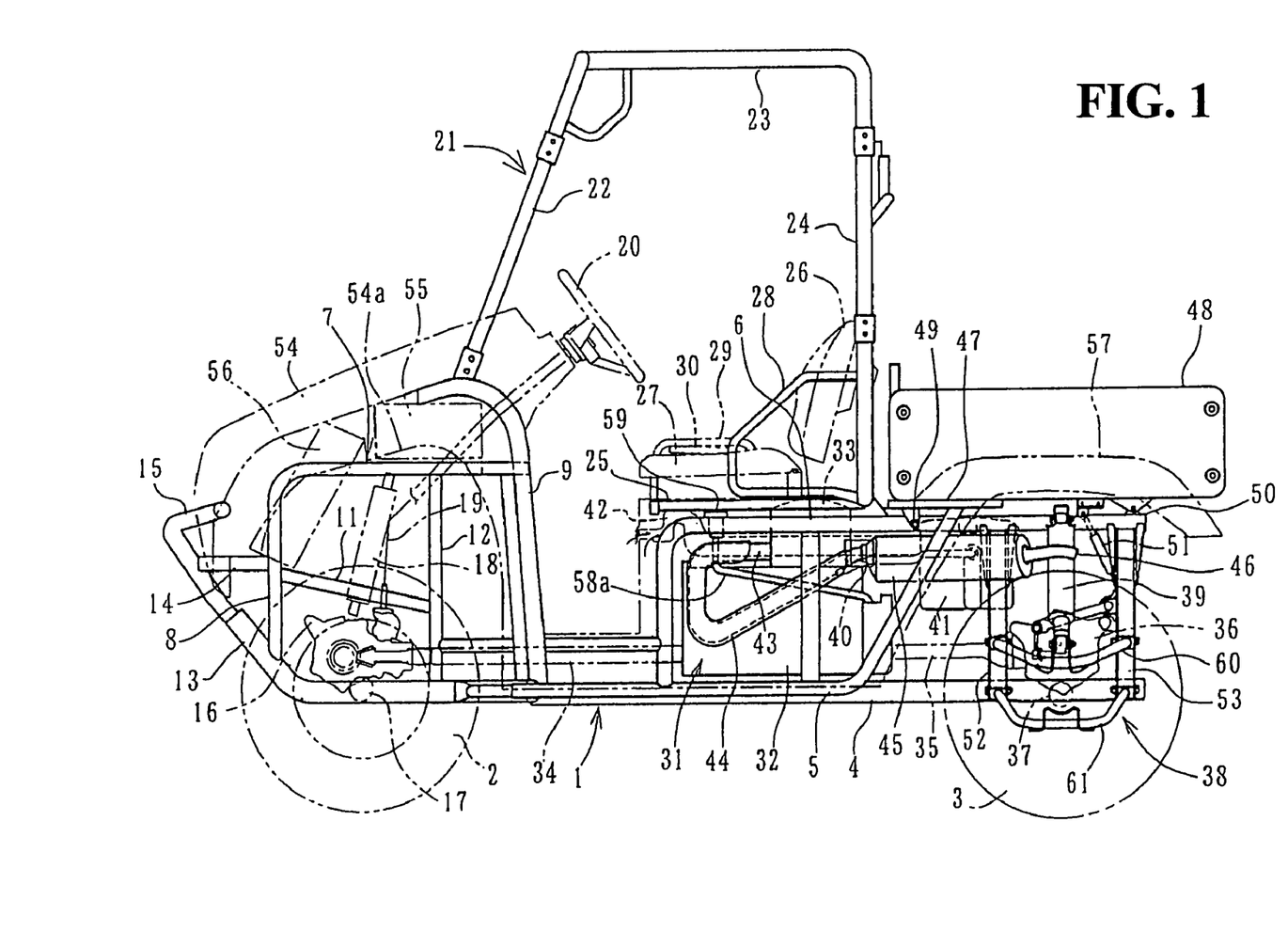
FIG. 1 is a side view of a small vehicle according to an embodiment of the present invention.

FIG. 1 is a side view of a small vehicle or the like according to an embodiment of the present invention. This small vehicle is configured for rough-terrain traveling and includes four independently suspended front and rear wheels and two left and right seats. Specifically, a pair of front wheels 2 and a pair of rear wheels 3 are suspended independently in the front and rear of a vehicle body frame 1 so that it can be used as a golf cart or the like.

The vehicle body frame 1 includes center frames 4 extending in a fore-and-aft direction over substantially an entire length of the vehicle body along a center portion of vehicle width. Side frames 5 extend substantially in parallel on left and right sides thereof. Rear frames 6 extend above the center frames 4 rearward from the center portions thereof substantially in parallel. Front frames 7 are provided on the side of the front wheels 2.

The front frames 7 are formed substantially into an arch shape in side view, and include pillar portions 8 on front sides thereof, instrument panel frames 9 on rear sides thereof, horizontal portions 10 connecting upper portions thereof. Oblique portions 11 are connected at front ends thereof to the pillar portions 8 provided below the horizontal portions 10 so as to be inclined upwardly toward the front. Intermediate pillar portions 12 are connected to rear ends of the oblique portions 11 and are positioned in front of the instrument panel frames 9. Front ends of the center frames 4 include bent portions 13 bent obliquely upward at a front portion of the vehicle body. Distal ends thereof are connected to the pillar portions 8 via reinforcing members 14 and also are connected to a bumper 15.

A gear box 16 is provided inside the front frames 7. The front wheels 2 are connected via an axle 17 extending therefrom in left and right directions. The front wheels 2 are of an independently suspended double wishbone type, and are buffered by front cushions 18. Reference numeral 19 designates a steering axial line. Steering is achieved by a handle 20 supported above the instrument panel frames 9.

Roll bars 21 having an arch shape in side view extend between upper portions of the instrument panel frames 9 and midsections of the rear frames 6. The roll bars 21 each include a front section 22, a top section 23, and a rear section 24. Lower ends of the front sections 22 are integrated with the instrument panel frames 9. Lower ends of the rear sections 24 are connected to rear ends of a seat supporting member 25. The seat supporting member 25 is supported above the rear frames 6 so as to extend from front ends to the midsections thereof.

The rear sections 24 extend substantially perpendicularly in the vertical direction, and seatbacks 26 are supported on lower portions thereof. Seat cushions 27 are supported by the seat supporting member 25 so as to be capable of rotating about rear portions thereof independently of the seatbacks 26. Side supports 28 protruding toward the sides of the seat cushions 27 are provided on the lower portions of the rear sections 24. Reference numeral 29 designates a center support 29, and reference numeral 30 designates a parking brake lever.

A power unit 31 is supported between the rear frames 6 and the center frames 4 below the seat cushions 27. The power unit 31 is a vertically standing type which is arranged with an axial direction of a crankshaft provided in a crankcase 32 oriented in the fore-and-aft direction and an upper portion of a cylinder section 33 extends beyond the rear frame 6 and is overlapped with the seat supporting member 25 in side view, and is projected to a high position near a bottom of the seat cushion 27.

Propeller shafts 34 and 35 extend in the fore-and-aft direction in the front and the rear of the crankcase 32. The front propeller shaft 34 is connected at a front end to the gear box 16 for driving the axle 17. The rear propeller shaft 35 is connected at a rear end to a gear box 36 whose rear end is supported between the rear ends of the center frames 4 and the rear frames 6 to drive the rear wheels 3 via an axle 37 extending toward the left and the right from the gear box 36.

A driving mode in this small vehicle is a 2WD-4WD change-over type in which the two-wheel drive (2WD) type for driving only the rear wheels and the four-wheel drive (4WD) type which also drives the front wheels as well as desired. Therefore, the propeller shaft 34 is a part-time drive type, and the propeller shaft 35 is a full-time drive type.

The rear wheels 3 are independently suspended by a double wishbone type rear wheel suspension 38. Reference numeral 39 designates a rear cushion.

A throttle body 40 is connected to an air-intake port of the cylinder section 33 from behind. Fresh air is supplied from an air cleaner 41 behind the throttle body 40. The air cleaner 41 is provided with a snorkel 42 extending toward the front substantially in parallel with the rear frame 6. A front end of the snorkel 42 is located below a front end of the seat cushion 27 and opens toward a space for accommodating legs of a passenger seated in a cabin so as to be oriented forward and downward. An opening position is at a higher level than a position of a tail pipe of an exhaust system, described later.

The front end of the snorkel 42 has an opening opened toward the front, and is formed with a downwardly oriented opening by a notch provided on the lower side of the front end. In front of the front end opening of the snorkel 42 is provided with a louver, so that outside air is taken from obliquely below. It is also adapted to introduce outside air from the lower side also through the downwardly oriented opening. In this arrangement, outside air which contains less mud or the like mixed therein can be introduced from a relatively high position using the space for accommodating the legs of the passenger when seated.

A front end of the exhaust pipe 43 is connected to an exhaust port of the cylinder section 33. The exhaust pipe 43 extends toward the front and then turned back toward the rear, is passed on a lateral side of the crankcase 32 and extends toward the rear, and is connected to a silencer 45 supported below the rear frame 6. Reference numeral 44 designates an exhaust pipe cover.

A rear end of the silencer 45 is positioned forwardly of the rear cushion 39, and a tail pipe 46 extending from the rear end toward the rear passes through a lateral side of the rear cushion 39 so as to be overlapped therewith in side view.

A rear portion of the side frame 5 is curved so as to be inclined upward near the rear end of the crankcase 32 and extends rearward. The rear end thereof extends beyond the rear frame 6 and is connected to a carrier 47 at a high position, which is substantially the same level as the seat supporting member 25. A front portion of a load-carrying platform 48 is placed on the carrier 47, and is connected to the rear frame 6 via a hinge 49. The rear portion of the load-carrying platform 48 is connected to a rear end of the rear frame 6 via a stay 50 on a bottom surface thereof.

Reference numeral 51 is a damper for supporting the load-carrying platform 48, reference numeral 52 designates a front arm supporting frame, and reference numeral 53 designates a rear arm supporting frame 53 for supporting the suspension arm.

Reference numeral 54 designates a front cover. A rear portion of the front cover 54 covers from an upper end of the steering axial line 19 near the handle 20 over the instrument panel frames 9, and is provided with front fenders 54a on left and right sides thereof Reference numeral 55 designates a battery and reference numeral 56 designates a radiator. The radiator 56 is arranged so as to be inclined downward toward the front for cooling the cylinder section 33. Reference numeral 57 designates a rear fender.

Figure 2:
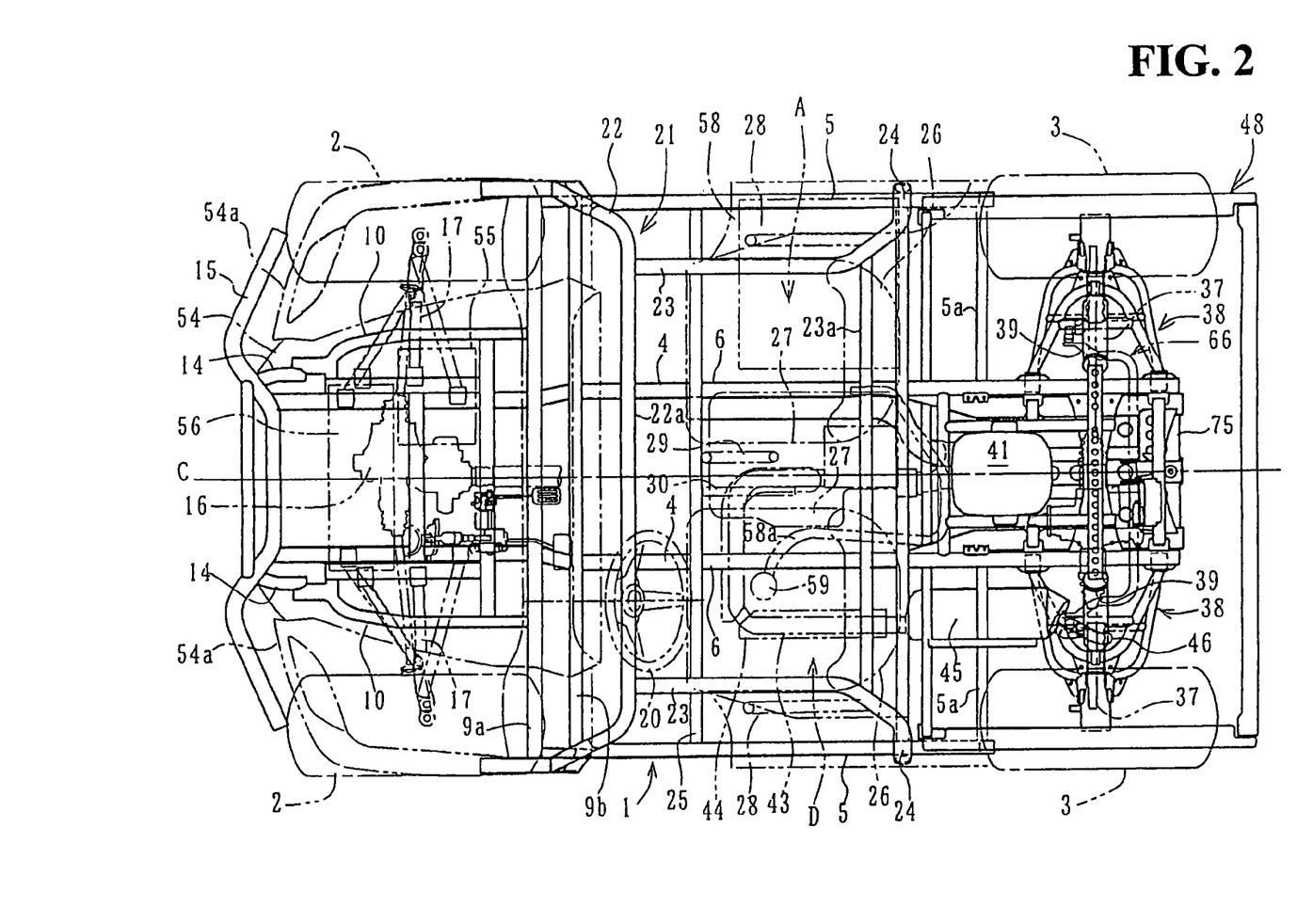
FIG. 2 is a plan view of the small vehicle.

FIG. 2 is a plan view showing mainly the vehicle body frame 1. The vehicle body frame 1 is provided substantially in lateral symmetry with respect to a centerline C of the vehicle body. The front wheels 2 and the rear wheels 3 are also provided on the left and right sides. A driver's seat D and a passenger seat A are arranged on the left and right sides. Provided in the intermediate portion between the driver's seat D and the passenger seat A is the parking brake lever 30 on the side of the driver's seat, and the center support 29 on the side of the passenger seat A. The center support 29 is arranged in the fore-and-aft direction, and serves as a grip to be held when the vehicle is rolling.

The roll bar 21 is formed into substantially an arch shape in front view provided at the front section 22 with a top-side cross portion 22a. The top sections 23 on the left and right sides are connected at the distal ends thereof to the top-side cross portion 22a and between bent portions at the rear portions on the left and right sides are connected by a cross portion 23a.

The center frames 4 and the rear frames 6 on the left and right sides are disposed so as to pass near the lateral centers of the passenger seat A and the driver's seat D respectively on both sides of the center of the vehicle body in parallel to each other. The side frames 5 are arranged in parallel on the outer sides thereof The side frames 5 define the substantially outermost portions on the left and right sides of the vehicle body.

On the side of the front frame 7, the instrument panel frames 9 are provided with cross members 9a, 9b for connecting the left and right sides. On the side of the rear frame 6, a cross member 6a is provided rearwardly of the seatbacks 26 and connects the left and right rear frames 6. Rear ends of the side frames 5 are connected to rear portions of the rear frames 6 with cross members 5a, and a carrier, not shown, is mounted thereon.

The power unit 31 is arranged downwardly of the intermediate portion between the passenger seat A and the driver's seat D. The power unit 31 is arranged so as to extend across the center line C of the vehicle body.

Figure 3:
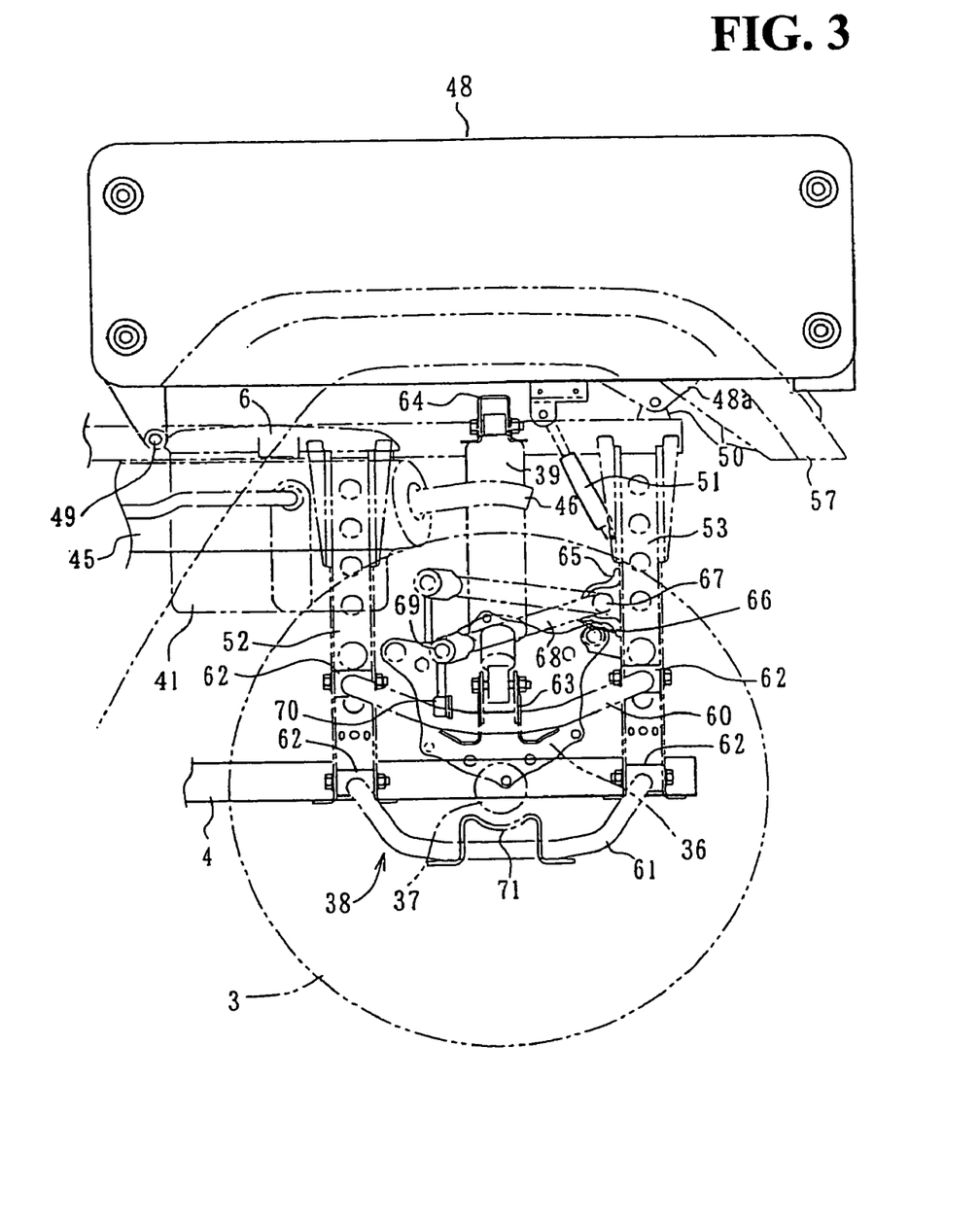
FIG. 3 is an enlarged side view of a rear portion of a vehicle body.

A fuel tank 58 is arranged downwardly of the passenger seat A. A fuel port 59 is arranged downwardly of the driver's seat D. A fuel feed pipe 58a extending therefrom is connected to the fuel tank 58 via a long route passing from the left side of the power unit 31 to the rear side thereof FIG. 3 is an enlarged side view on the side of the rear portion of the vehicle body. The load-carrying platform 48 is supported in such a manner that a bottom portion thereof is lifted up to keep a predetermined distance apart from the rear frames 6. A stay 48a provided at a rear end on the bottom thereof is disengageably engaged with the stay 50 provided on the rear end of the rear frame 6. An end of the damper 51 is connected to the bottom of the load-carrying platform 48 on a front side of the stay 48a and the other end thereof is supported by an upper portion of the rear arm supporting frame 53, which connects rear ends of the center frames 4 and the rear frames 6 in the vertical direction. When releasing connection between the stays 48a and 50 and rotating the load-carrying platform 48 forward about the hinge 49, the rotating state can be maintained by the damper 51.

The front arm supporting frame 52 and the rear arm supporting frame 53 are provided on a front side and a rear side of the rear cushion 39 in parallel in the vertical direction, and are connected to the center frames 4 and the rear frames 6 on upper and lower ends thereof The rear wheel suspension 38 is supported by the front and rear arm supporting frames 52, 53. The rear wheel suspension 38 has a double wishbone structure and an upper arm 60 and a lower arm 61 as suspension arms are arranged at a distance in the vertical direction and the ends thereof are swingably supported by the front arm supporting frame 52 and the rear arm supporting frame 53 via a rubber bush 62.

A cushion bracket 63 is provided at a distal end of the upper arm 60 and a lower end of the rear cushion 39 is mounted thereto with a bolt. The rear cushion 39 is arranged substantially in the vertical direction perpendicularly in side view, and an upper end thereof is mounted to an end of a cross member 64. The upper end of the cross member 64 projects upward from the rear frame 6, and is positioned near the bottom of the load-carrying platform 48. A mounting position of the upper end of the rear cushion 39 with respect to the upper end of the cross member 64 is at a level higher than the rear frame 6 so that a sufficient cushion stroke is ensured.

A stabilizer bracket 65 formed of a spring member is provided on a front surface of the rear arm supporting frame 53 which is located at a lower level than the upper arm 60 and the lower arm 61. A cross portion 67 of a stabilizer 66 is rotatably supported thereby. An arm portion 68 of the stabilizer 66 extends so as to be inclined downward toward the front, and passes inwardly of the rear cushion 39 so as to be overlapped therewith in side view. The tail pipe 46 overlaps with the outside of the rear cushion 39 in side view.

A front end of the arm portion 68 is connected to the upper arm 60 via joints 69, 70. The joint 69 is connected to the arm portion 68 by a joint shaft extending in the lateral direction, and the joint 70 is connected to the upper arm 60 at a position forwardly of the cushion bracket 63 by a joint shaft extending in the fore-and-aft direction. The stabilizer 66 assumes an unloaded state shown by a solid line in the drawing, and a loaded state shown by an imaginary line in which the front end side of the arm portion 68 is swung and changed in position in the vertical direction by twisting the cross portion 67.

A bracket 71 is provided at a distal end of the lower arm 61. The upper arm 60 and the lower arm 61 are mounted to a knuckle (described later) of the rear wheel 3 via the brackets 63 and 71.

Figure 4:
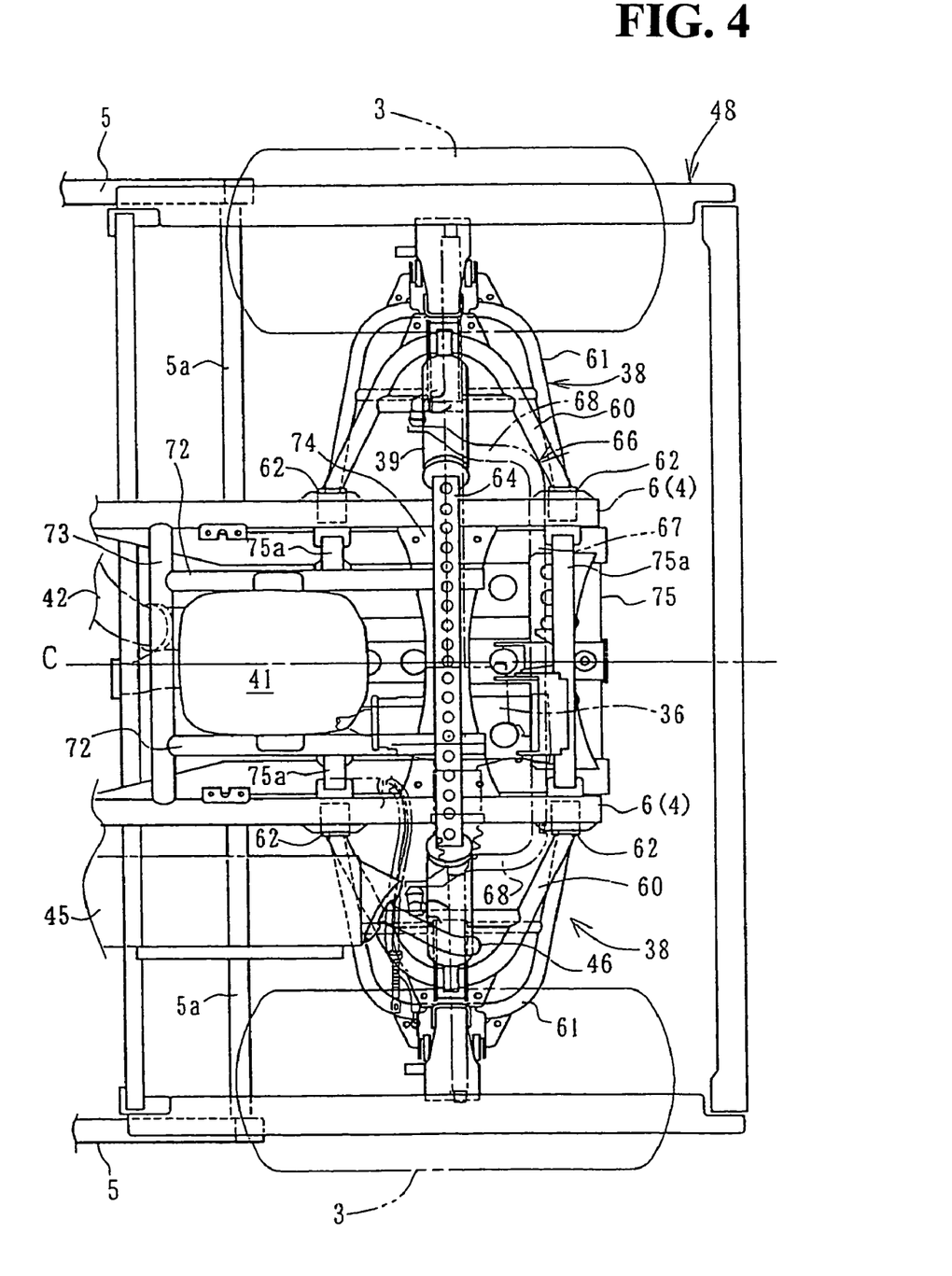
FIG. 4 is an enlarged plan view of the rear portion of the vehicle body.

FIG. 4 is an enlarged plan view of the rear portion of the vehicle body. Fore-and-aft members 72 extending in parallel with the intermediary of the air cleaner 41 therebetween are provided inside the rear portions of the left and right rear frames 6 for supporting the air cleaner 41. Front ends of the fore-and-aft members 72 are connected to a cross portion 73 for connecting the left and right rear frames 6. Rear portions of the fore-and-aft members are connected to a cross member 74 for connecting the left and right rear frames 6 at a position downwardly of the cross member 64. Midsections of the left and right fore-and-aft members 72 are connected to the rear frames 6 with short members 75*a*.

The cross member 64 connects between the left and right rear frames 6. Both ends in the longitudinal direction of the cross member 64 project outward from the rear frames 6. The projections serve as mounting portions with respect to the upper ends of the rear cushions 39. The positions of the mounting portions are located near the bottom of the load-carrying platform 48 that is located at a level higher than the rear frames 6 at a distance apart from the rear frames 6.

The rear ends of the left and right center frames 4 are connected by a cross member 75 having a wide flat portion. The cross portion 67 of the stabilizer 66 is positioned above and overlapped with the cross member 75 in plan view. Reference numeral 75*a* designates the narrower cross member for connecting between the rear ends of the left and right rear frames 6 above the cross member 75. A rear portion of the gear box 36 is supported by the cross members 75 and 75*a*.

The cross portion 67 of the stabilizer 66 is a straight portion extending in the lateral direction. The left and right arm portions 68 are integrally continued by the cross portion 67, so that when one of the left and right rear wheels 3 is moved upward or downward, one of the arm portions 68 is moved, for example, upward and hence the cross portion 67 is twisted, so that the other arm portion 68 is moved downward.

Therefore, even when one of the rear wheels 3 which are suspended independently is moved significantly upward and downward due to passage on the rough ground, the posture of the vehicle body can be stabilized against the lateral swing by moving the other rear wheel 3 in the opposite direction.

Figure 5:
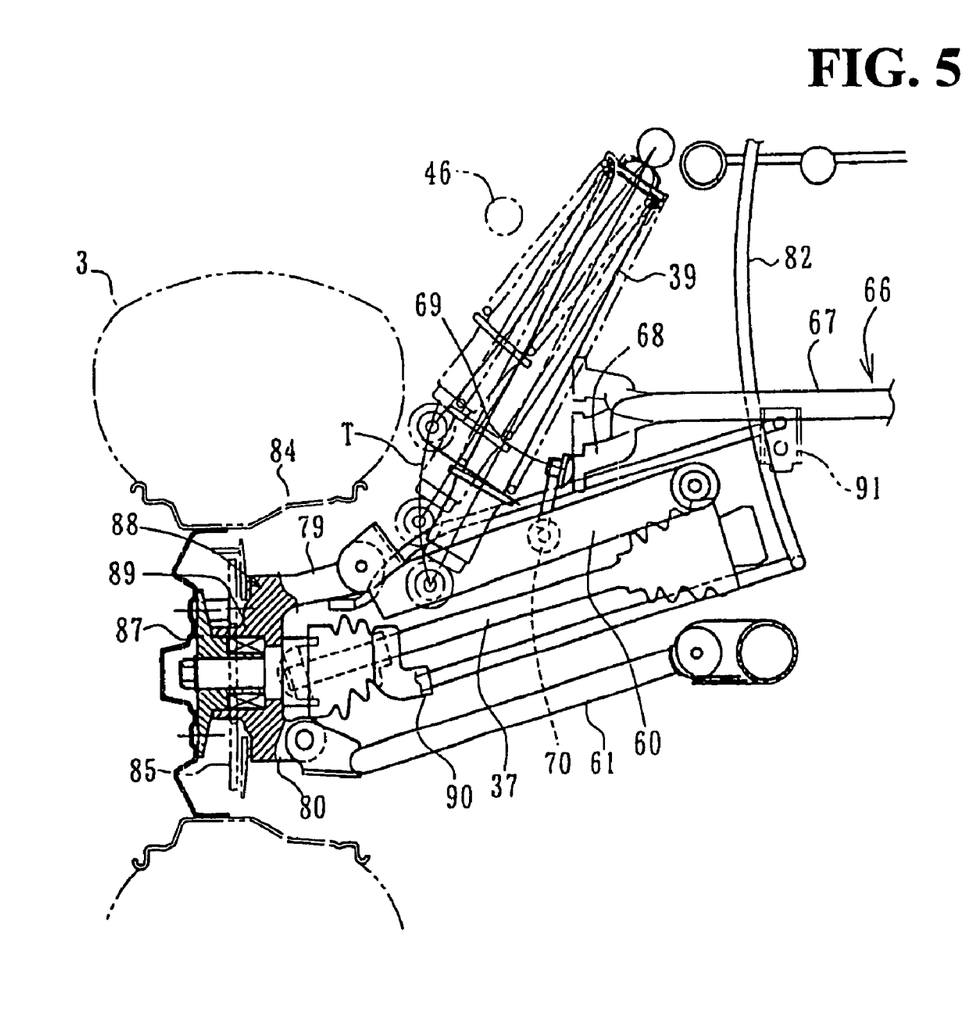
FIG. 5 is an enlarged back view of a rear wheel suspension portion.

The rear wheel suspension 38 will be described further in detail below. FIG. 5 is an enlarged back view of the left rear wheel suspension 38. The axle 37, the upper arm 60 and the lower arm 61 are disposed substantially in parallel at a distance in the vertical direction. The upper arm 60 and the lower arm 61 are connected to an upper knuckle arm 79 and a lower knuckle arm 80 of a knuckle 88. A center boss 89 provided at a center portion of the knuckle 88 is fitted to a hub 87 via a bearing so that the hub 87 is rotatably supported.

The rear cushion 39 is swung from a lower limit position shown by a solid line in the drawing upward as shown by an imaginary line. The lower end of the rear cushion 39 moves along a track T about the upper end. At this time, the arm portion 68 of the stabilizer 66 rotates about the cross portion 67 with a distal end twisted, and hence is arranged sufficiently inward so as to avoid interference with the rear cushion 39 as shown in the drawing. The tail pipe 46 is arranged on the outside thereof so as to avoid interference with the rear cushion 39.

A parking brake cable 82 is arranged through a space between the upper arm 60 and the lower arm 61. A rear wheel brake hydraulic hose 83 is disposed above the upper arm 60 so as to be overlapped therewith in the vertical direction. The parking brake cable 82 extends rearwardly from the parking brake lever 30 (FIG. 2) along the center of the vehicle body and extends downward from above the upper arm 60, and then is bent below the axle 37 and extends laterally in substantially parallel with the axle 37, is supported by a holder 90 provide on the axle 37. A distal end thereof further extends laterally and is connected to a brake caliper of the rear wheel brake. The rear wheel brake hydraulic hose 83 extends from a holder 91 that supports a midsection thereof laterally along an upper surface of the upper arm 60. A distal end thereof enters under the upper knuckle arm 79 and is connected to the brake caliper of the rear wheel brake like the parking brake cable 82.

Figure 6:
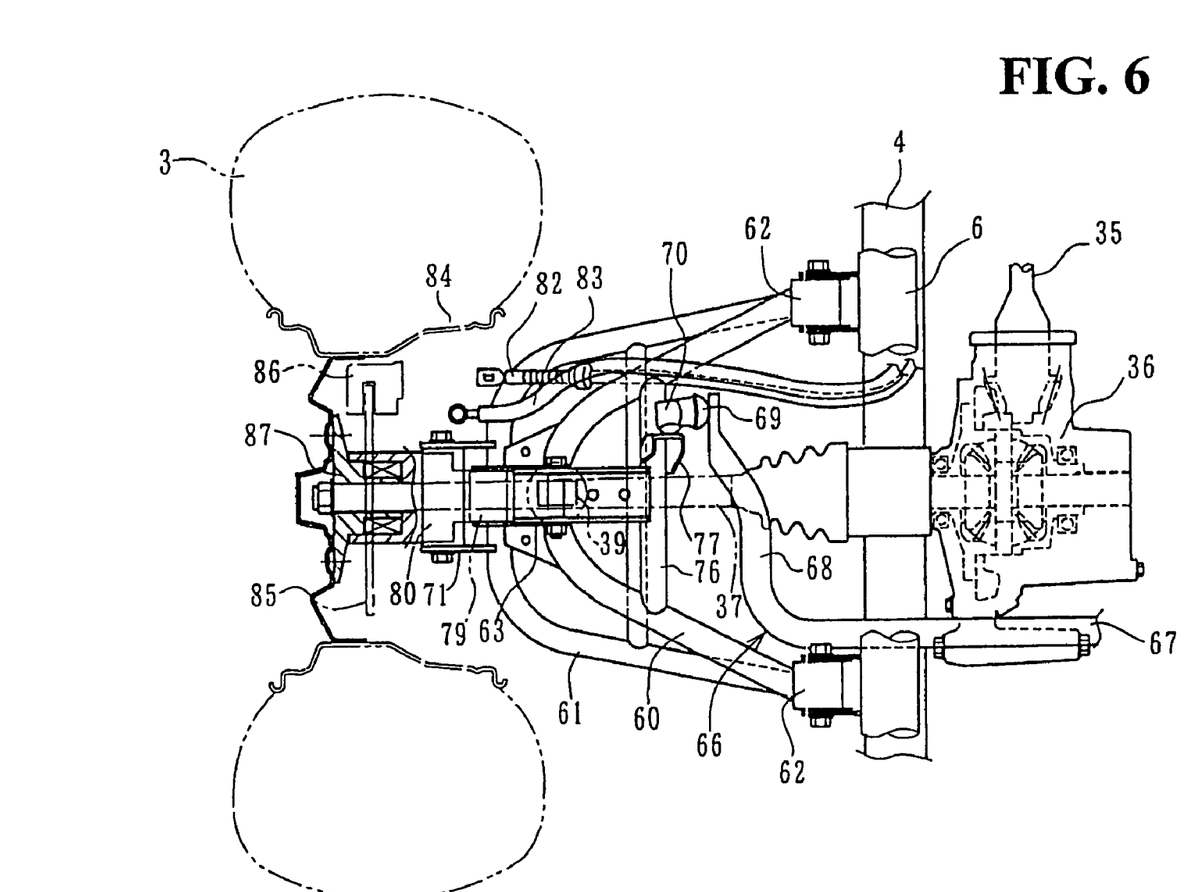
FIG. 6 is an enlarged plan view of the rear wheel suspension section.

FIG. 6 is a plan view of the rear wheel suspension 38. As is clearly shown in the drawing, the stabilizer 66 is arranged in a space upwardly and inwardly of the upper arm 60. A reinforcing pipe 76 for connecting the front and rear portion of the upper arm 60 is provided inside the distal end thereof The joint 70 is mounted to a bracket 77 provided on the reinforcing pipe 76.

Therefore, the arm portion 68 of the stabilizer 66 is arranged inside the distal ends of the upper arm 60 which project toward the left and right in plan view so as to overlap therewith, and is protected by the upper arm 60 from below. The arm portion 68 of the stabilizer 66 does not protrude laterally from the upper arm 60, and hence the stabilizer 66 is more compact than the upper arm 60, so that the existence of the stabilizer 66 does not affect the vehicle width.

The cushion bracket 63, extending relatively long in the lateral direction from the center frame 4, is connected at a midsection thereof to the lower ends of the rear cushion 39, and is connected at a distal end 78 to the upper knuckle arm 79. The bracket 71 of the lower arm 61 is connected to the lower knuckle ann. 80 at substantially the same position in the vertical direction.

The parking brake cable 82 and the rear wheel brake hydraulic hose 83 are disposed so as to be almost overlapped with each other in the vertical direction. The respective distal ends enter into an internal space of a rim 84 of the rear wheel 3. A rear wheel brake including a brake disk 85 is disposed in the rim 84. A brake caliper 86 and the brake disk 85 rotates integrally with the hub 87. The hub 87 rotates integrally with the axle 37.

The brake caliper 86 is operated by a hydraulic pressure of the rear wheel brake hydraulic hose 83. Also, by pulling the parking brake cable 82 by the parking brake lever 30, a hydraulic pressure is generated in the brake caliper 86 to activate a piston to operate the parking brake. The rotation of the brake disk 85 is stopped to operate the parking brake.

Subsequently, an operation of this embodiment will be described. As shown in FIGS. 3 to 6, the stabilizer 66 is arranged above the left and right upper arms 60 and inside the upper arms 60 in plan view. Therefore, the stabilizer 66 is protected by being surrounded by the upper arms 60. In addition, the strength of the stabilizer 66 by itself does not have to be increased, the stabilizer 66 is not increased in weight, and a separate member does not have to be provided specifically for protecting the stabilizer 66. In addition, the arm portion 68 of the stabilizer 66 is arranged inside the distal ends projecting toward the left and right of the upper arm 60. Therefore, the arm portion 68 is not a factor in increasing the vehicle width. In addition, the stabilizer 66 can be downsized and the existence thereof does not affect the vehicle width.

Therefore, in the rear wheel suspension structure having the stabilizer 66, increase in number of components and in weight can be prevented, and hence the compact, light weight and simple configuration is achieved. In particular, even when it is used for rough-terrain traveling which may cause contact of the obstacles such as rocks with respect to the stabilizer, remarkable effects can be obtained without increasing the weight.

In addition, the arm portions 68 of the stabilizer 66 are arranged inside the rear cushions 39. Therefore, the stabilizer 66 can be downsized, and a structure in which swinging movement of the rear cushion 39 is not hindered is achieved while protecting the stabilizer 66 itself further by the rear cushion 39.

Since the cross portion 67 of the stabilizer 66 is supported so as to be capable of pivoting toward the front of the rear arm supporting frame 53 via the stabilizer bracket 65 provided on the front surfaces of the rear arm supporting frames 53, the stabilizer 66 can be protected by the vehicle body frame composed of the rear arm supporting frames 53. In addition, by supporting the stabilizer 66 using the rear arm supporting frames 53, the vehicle body frame can be simplified.

In addition, the cross member 75 which is a part of the vehicle body frame is extended in the direction of the width of the vehicle so as to be overlapped with the lower portion of the stabilizer 66 and is provided so as to be extended widely in width. Therefore, the stabilizer 66 can be protected by the cross member 75 in a simple configuration.

Since the lower arm 61 can be used as the protecting member of the stabilizer 66 by configuring the suspension structure as the independent suspension type having the double wishbone structure, and connecting between the respective upper arms 60 of the left and right suspension sections of the vehicle body frame by the stabilizer 66, the stabilizer 66 can be downsized and reduced in weight. Therefore, the suspension structure having the stabilizer 66 can be formed into a light weight and simple configuration, and the structure, which is suitable for the suspension in the double wishbone structure, is achieved.

In addition, the stabilizer 66 is arranged on the upper side of the upper arms 60 in side view. Therefore, the stabilizer 66 can be arranged easily without interfering with the upper arms 60 or the lower arms 61.

This invention can be modified or applied variously without being limited to the above-described embodiment. For example, the stabilizer structure of this invention can be applied not only to the suspension arm with the double wishbone form, but also to a suspension structure in which a single suspension arm is provided. It can be applied not only to the rear wheel suspension, but also to the front wheel suspension, or to both of them.

A vehicle to which the suspension structure of this invention is applied may be small vehicles of various applications such as a golf cart or a four-wheel buggy, and is very effective when it is applied to a vehicle for rough-terrain traveling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension structure for a small vehicle, the small including a vehicle body frame, left and right rear wheels suspended independently at left and right positions on a rear portion of the vehicle body frame via suspension arms, and a stabilizer for connecting the left and right suspension arms, said suspension structure comprising:
the stabilizer being arranged upwardly of the left and right suspension arms and inside the left and right suspension arms in plan view, and
wherein the vehicle body frame includes arm supporting frames provided in front of and rearwardly of the suspension arms for swingably supporting ends thereof, and the stabilizer is supported so as to be capable of swinging in front of the rear arm supporting frame.

2. The suspension structure for a small vehicle according to claim 1, wherein cushions for swingably supporting the suspension arms are arranged outwardly of the stabilizer.

3. The suspension structure for a small vehicle according to claim 2, wherein the vehicle body frame includes a cross member extending in a direction of vehicle width on a lower side of the stabilizer.

4. The suspension structure for a small vehicle according to claim 1, wherein the vehicle body frame includes a cross member extending in a direction of vehicle width on a lower side of the stabilizer.

5. A suspension structure for a small vehicle, the small vehicle including wheels that are independently suspended via a double wishbone structure, the double wishbone structure including suspension arms having an upper arm and a lower arm that are arranged above and below each other and on left and right sides of a vehicle body frame, and the left and right suspension arms are connected by a stabilizer, said suspension structure comprising:
the stabilizer being arranged inside the upper arms or the lower arms in plan view and connected to the left and right upper arms.

6. The suspension structure for a small vehicle according to claim 5, wherein the stabilizer is arranged on an upper side of the upper arms in side view.

7. A vehicle, comprising:
a vehicle body frame;
a pair of rear wheels;
a pair of suspension arms for suspending the rear wheels on a rear portion of the vehicle body frame; and
a stabilizer for connecting the suspension arms, the stabilizer being arranged upwardly of the suspension arms and inside the suspension arms in plan view,
wherein the vehicle body frame includes arm supporting frames provided in front of and rearwardly of the suspension arms for swingably supporting ends thereof, and the stabilizer is supported so as to be capable of swinging in front of the rear arm supporting frame.

8. The vehicle according to claim 7, wherein cushions for swingably supporting the suspension arms are arranged outwardly of the stabilizer, the cushions being telescoping members.

9. The vehicle according to claim 8, wherein the vehicle body frame includes a cross member extending in a direction of vehicle width on a lower side of the stabilizer.

10. The vehicle according to claim 7, wherein the vehicle body frame includes a cross member extending in a direction of vehicle width on a lower side of the stabilizer.

* * * * *